_(12)_ United States Patent
Shiota et al.

(10) Patent No.: US 9,298,187 B2
(45) Date of Patent: Mar. 29, 2016

(54) VEHICLE TRAVEL ASSIST APPARATUS

(71) Applicant: ADVICS CO., LTD., Kariya (JP)

(72) Inventors: Masaki Shiota, Anjyo (JP); Yosuke Ohmori, Chiryu (JP); Yukio Mori, Nagoya (JP); Masayoshi Takeda, Kariya (JP)

(73) Assignee: ADVICS CO., LTD., Kariya, Aichi-Pref. (JP)

( * ) Notice: Subject to any disclaimer, the term of this patent is extended or adjusted under 35 U.S.C. 154(b) by 0 days.

(21) Appl. No.: 14/405,744

(22) PCT Filed: Jun. 13, 2013

(86) PCT No.: PCT/JP2013/066353
§ 371 (c)(1),
(2) Date: Dec. 4, 2014

(87) PCT Pub. No.: WO2013/187477
PCT Pub. Date: Dec. 19, 2013

(65) Prior Publication Data
US 2015/0153737 A1    Jun. 4, 2015

(30) Foreign Application Priority Data

Jun. 13, 2012   (JP) .................................. 2012-133973

(51) Int. Cl.
*G05D 1/02*        (2006.01)
*B60T 7/22*        (2006.01)
*G05D 13/02*       (2006.01)

(52) U.S. Cl.
CPC ............. *G05D 1/0289* (2013.01); *B60T 7/22* (2013.01); *G05D 13/02* (2013.01); *B60T 2201/022* (2013.01)

(58) Field of Classification Search
CPC . B60T 7/22; B60T 2201/02; B60T 2201/022; G05D 1/028; G05D 1/0287; G05D 1/0289; G05D 13/00; G05D 13/02
See application file for complete search history.

(56) References Cited

U.S. PATENT DOCUMENTS 6,070,682 A  *  6/2000  Isogai ............... B60K 31/0008
                                               180/167
6,389,351 B1 *  5/2002  Egawa ............... B60K 31/0008
                                               340/903

(Continued)

FOREIGN PATENT DOCUMENTS

EP          2 036 791 A1     3/2009
JP          11-20496 A       1/1999

(Continued)

OTHER PUBLICATIONS

International Search Report (PCT/ISA/210) mailed on Jul. 23, 2013, by the Japanese Patent Office as the International Searching Authority for International Application No. PCT/JP2013/066353.

(Continued)

*Primary Examiner* — Jerrah Edwards
*Assistant Examiner* — Tamara Weber
(74) *Attorney, Agent, or Firm* — Buchanan Ingersoll & Rooney PC (57) ABSTRACT

A collision avoidance ECU sets a target relative deceleration to a first target value when a brake control starting condition is satisfied, and carries out a first brake control for bringing a relative deceleration closer to the target relative deceleration. When a reference relative deceleration with reference to the relative deceleration at a first point in time has reached a specified relative deceleration, the collision avoidance ECU determines a greater value for a second target value when the amount of change in deceleration, which is the amount of change in the reference relative deceleration at the point in time, is small than when the amount of change in deceleration is large. The collision avoidance ECU then sets the target relative deceleration to the second target value, and carries out a second brake control for bringing the relative deceleration closer to the target relative deceleration.

5 Claims, 5 Drawing Sheets

(56) References Cited

U.S. PATENT DOCUMENTS

| | | | | |
|---|---|---|---|---|
| 6,401,024 | B1* | 6/2002 | Tange | B60K 31/0008 180/170 |
| 8,078,383 | B2* | 12/2011 | Isaji | B60W 10/184 340/425.5 |
| 8,676,443 | B2* | 3/2014 | Han | B60W 10/18 180/167 |
| 2001/0004028 | A1* | 6/2001 | Sato | B60K 31/0008 180/169 |
| 2002/0023793 | A1* | 2/2002 | Hattori | B60T 7/22 180/169 |
| 2002/0026276 | A1* | 2/2002 | Hattori | B60K 31/0008 701/96 |
| 2004/0167702 | A1 | 8/2004 | Isogai et al. | |
| 2004/0199327 | A1 | 10/2004 | Isogai et al. | |
| 2006/0152350 | A1* | 7/2006 | Swoboda | B60K 31/0008 340/435 |
| 2007/0021876 | A1* | 1/2007 | Isaji | B60K 28/066 701/1 |
| 2009/0319148 | A1 | 12/2009 | Kubo et al. | |
| 2010/0217486 | A1* | 8/2010 | Taguchi | B60T 7/042 701/41 |
| 2012/0078483 | A1* | 3/2012 | Yajima | B60T 8/1764 701/73 |
| 2013/0144465 | A1* | 6/2013 | Shida | B60T 7/22 701/1 |

FOREIGN PATENT DOCUMENTS

| | | | |
|---|---|---|---|
| JP | 2000-177428 | A | 6/2000 |
| JP | 2004-17924 | A | 1/2004 |
| JP | 2010-104087 | A | 5/2010 |
| JP | 2011-51535 | A | 3/2011 |

OTHER PUBLICATIONS

English language translation of International Preliminary Report on Patentability (PCT/IB/373) and Written Opinion of the International Searching Authority (PCT/ISA/2370) issued Dec. 16, 2014, by the International Bureau of WIPO in corresponding International Application No. PCT/JP2013/066353. (4 pages).

European Search Report issued Jan. 26, 2016, by the European Patent Office, in corresponding European Patent Application No. 13805100.8. (8 pages).

* cited by examiner

VEHICLE TRAVEL ASSIST APPARATUS

FIELD OF THE INVENTION

The present invention relates to a vehicle travel assist apparatus.

BACKGROUND OF THE INVENTION

In recent years, a travel assist apparatus which controls travel of a vehicle according to a set target has been under development. As one example of such a travel assist apparatus, there is known an apparatus that performs vehicle control such that the distance between two vehicles, that is, a host vehicle and a preceding vehicle present ahead of the host vehicle in the traveling direction of the host vehicle, is kept at a predetermined distance or more (refer to Patent Document 1, for example).

In the above-described apparatus, the distance between the host vehicle and the preceding vehicle is monitored. Then, when the distance between the two vehicles is less than a predetermined distance, a difference is calculated by subtracting the distance between the two vehicles from the predetermined distance, thereby controlling the vehicle speed (more specifically, a relative speed of the host vehicle with reference to the preceding vehicle) such that the difference becomes less than 0 (zero). For example, a target relative deceleration is set to be a greater value when the above-described difference is great than when the difference is small. Speed-reduction control is performed such that a relative deceleration of the host vehicle with reference to the preceding vehicle is brought close to the target relative deceleration.

PRIOR ART DOCUMENTS

Patent Documents

Patent Document 1: Japanese Laid-Open Patent Publication No. 2000-177428

SUMMARY OF THE INVENTION

Incidentally, the above-described travel assist apparatus includes an apparatus that calculates the difference at a predetermined interval, which has been set in advance, and the target relative deceleration is changed to a value according to the latest difference. In this case, the target relative deceleration is to be changed for each change in the above-described difference.

When a control gain (for example, a proportional gain and an integration gain) used in speed-reduction control including feedback control is great, it is possible to increase smoothly a relative deceleration to the vicinity of a target relative deceleration. However, after reaching the vicinity of the relative deceleration of the target relative deceleration, an overshoot in which the relative deceleration exceeds the target relative deceleration and an undershoot in which the relative deceleration is lower than the target relative deceleration repeatedly occur. Thereby, it takes a certain period of time to converge the relative deceleration to a constant value. This is due to the fact that even at the time of overshoot or undershoot, the above-described difference is changed to change the target relative deceleration according to change in the above-described difference. As described above, when the target relative deceleration, which is a target value, is not fixed to a constant value, with the control gain set at a great value, it is rather difficult to converge the relative deceleration. In this case, at the time of speed-reduction control, there is a fear that drivability may be reduced due to an increase and a decrease in deceleration of the host vehicle.

A method for suppressing the above-described reduction in drivability includes a method for diminishing the above-described control gain. In this case, after reaching the vicinity of the relative deceleration of the target relative deceleration, it is possible to easily converge the relative deceleration to a constant value at an earlier stage. However, in this case, in the course of increasing the relative deceleration to the vicinity of the target relative deceleration, the relative deceleration will be changed at a low gradient. Therefore, in order to avoid collision between a host vehicle and a preceding vehicle, it is preferable that a predetermined distance is set to be a relatively long distance and speed-reduction control is started earlier.

The above-described problem can occur not only in a case where speed-reduction control is performed in order to keep the distance between the host vehicle and the preceding vehicle at a predetermined distance or longer, but also in a case where speed-reduction control is performed to reduce the relative speed to a value less than or equal to a specified speed up to a target position set ahead of the host vehicle in the traveling direction.

An object of the present invention is to provide a vehicle travel assist apparatus that is capable of starting speed-reduction control at an appropriate time point without causing a reduction in drivability.

Means for achieving the above objectives and advantages thereof will now be discussed.

In accordance with one aspect of the present invention, a vehicle travel assist apparatus is provided that performs speed-reduction control in which a relative deceleration (Gr) of a host vehicle (C1) with respect to an object (C2) present ahead of the host vehicle (C1) in a traveling direction becomes equal to a target relative deceleration (Af), and a relative speed (Vr) of the host vehicle (C1) with reference to the object (C2) becomes less than or equal to a specified speed (Vth) at a target position (P1) set behind the object (C2). At the time when a starting condition of the speed-reduction control is met, the target relative deceleration (Af) is set as a first target value (Af1), and first speed-reduction control is performed to bring the relative deceleration (Gr) closer to the target relative deceleration (Af) (S15, S19). When a reference relative deceleration (Asub), which is determined with reference to a relative deceleration at the time point when the first speed-reduction control has started, reaches a specified relative deceleration (Ath) (S14: YES), if a deceleration change amount (Jt), which is an amount of change in the reference relative deceleration at the time point, is small, a second target value (Af2) is set to a greater value than that in a case where the deceleration change amount (Jt) at the time point is great (S176). The second speed-reduction control is performed to set the target relative deceleration (Af) to the second target value (Af2) and bring the relative deceleration (Gr) closer to the target relative deceleration (Af) (S18, S19).

Even if the host vehicle (C1) starts to reduce speed by a speed-reduction control, the amount of change in deceleration thereof will be changed by speed reduction characteristics of the host vehicle (C1) at that time. That is, the amount of change in deceleration of the host vehicle (C1) will diminish when the host vehicle (C1) has difficulty in being reduced in speed. The amount of change will become larger when the host vehicle (C1) is easily reduced in speed. Therefore, when the reference relative deceleration (Asub) reaches a specified relative deceleration (Ath) in the course of allowing the relative deceleration (Gr) to move close to a first target value (Af1) by starting first speed-reduction control, a second target value (Af2) is determined based on the deceleration change amount (Jt) which is the amount of change in deceleration at the time point. Next, second speed-reduction control which allows the relative deceleration (Gr) to move close to the second target value (Af2) is performed in place of the first speed-reduction control. As a result, regardless of the speed reduction characteristics of the vehicle at that time, a relative speed (Vr) can be made less than or equal to a specified speed (Vth) at a target position (P1).

Further, in the above-described configuration, as compared with a case where the next target relative deceleration is sequentially changed by the difference between the reference relative deceleration at the time point and the target relative deceleration at the time point, the target relative deceleration (Af) can be set to a constant value at an earlier stage. Therefore, it is possible to smoothly converge deceleration of the vehicle to a constant value during the speed-reduction control. As a result, the vehicle has difficulty in repeating the increase and a decrease in deceleration during the speed-reduction control, even if a control gain used at the time of the speed-reduction control is set to be a greater value. Further, reduction in drivability at the time of the speed-reduction control is suppressed. Therefore, it is possible to start the speed-reduction control at an appropriate time point without the reduction in drivability.

The vehicle travel assist apparatus preferably includes a storage unit (202), which stores candidate values (Af2C(N)) that include a value greater than the specified relative deceleration (Ath) and are different from one another. The travel assist apparatus is configured such that when the deceleration change amount (Jt) obtained by the travel assist apparatus is small, a candidate value having a greater value than when the deceleration change amount (Jt) is great is selected, and the second target value (Af2) is determined based on the thus selected candidate value (S176, S18).

The vehicle travel assist apparatus preferably includes a storage unit (202), which stores candidate values (Af2C(N)) that include a value greater than the specified relative deceleration (Ath) and are different from one another. The travel assist apparatus is configured such that when the deceleration change amount (Jt) is obtained by the travel assist apparatus (S13), the second speed-reduction control is performed to select, based on the thus obtained deceleration amount of change (Jt) (S176), a candidate value at which an interval (Xs) can be smallest between a position of the host vehicle (C1) at a time point when the relative speed (Vr) reaches the specified speed (Vth) and the target position (P1), and the second target value (Af2) is determined based on the thus selected candidate value (S18). Thereby, it is possible to decrease as much as possible the interval (Xs) between the position of the host vehicle (C1) at which the relative speed (Vr) reaches the specified speed (Vth) and the target position (P1).

The travel assist apparatus preferably determines the second target value (Af2) in the following manner.

That is, there are calculated for each candidate value:

an estimated arrival time (T), which is an estimated time required from a first time point at which the reference relative deceleration (Asub) has reached the specified relative deceleration (Ath) to a second time point at which the reference relative deceleration (Asub) reaches a candidate value (Af2C(N));

an estimated relative speed (Vs), which is an estimated value of the relative speed at the second time point; and an estimated movement distance (X), which is an estimated value of movement distance of the host vehicle (C1) from the first time point to the second time point (S172, S173, S174).

The interval (Xs) is calculated for each candidate value based on the estimated arrival time (T), the estimated relative speed (Vs), and the estimated movement distance (X), which have been calculated (S175).

Then, as described above, the interval (Xs(N)) is calculated for each of the candidate values (Af2C(N)), and there is selected a candidate value with the smallest interval (Xs) of the respective candidate values (Af2C(N)). The second target value (Af2) can thus be determined based on the thus selected candidate value. Adoption of the above-described control configuration enables to set a target relative deceleration to a constant value at an earlier stage and also enables to suppress the reduction in drivability at the time of speed-reduction control.

When the first speed-reduction control is performed, the travel assist apparatus preferably sets the first target value (Af1) to be a greater value when the vehicle speed (VS) of the host vehicle (C1) is great than when the vehicle speed (VS) is low (S12). Thereby, it is possible to obtain, as the deceleration change amount (Jt), a value close to a limit value of amount of change in relative deceleration that can occur for the host vehicle (C1) at that time. It is, therefore, possible to easily set the second target value (Af2) as a value corresponding to the speed reduction characteristics of the host vehicle (C1) at that time.

In order to provide a better understanding of the present invention, a description has been given of the embodiment by using corresponding reference numerals. As a matter of course, the present invention is not limited to the embodiment.

DETAILED DESCRIPTION OF THE PREFERRED EMBODIMENTS

One embodiment of the present invention will now be described with reference to FIGS. 1 to 5.

Figure 1:
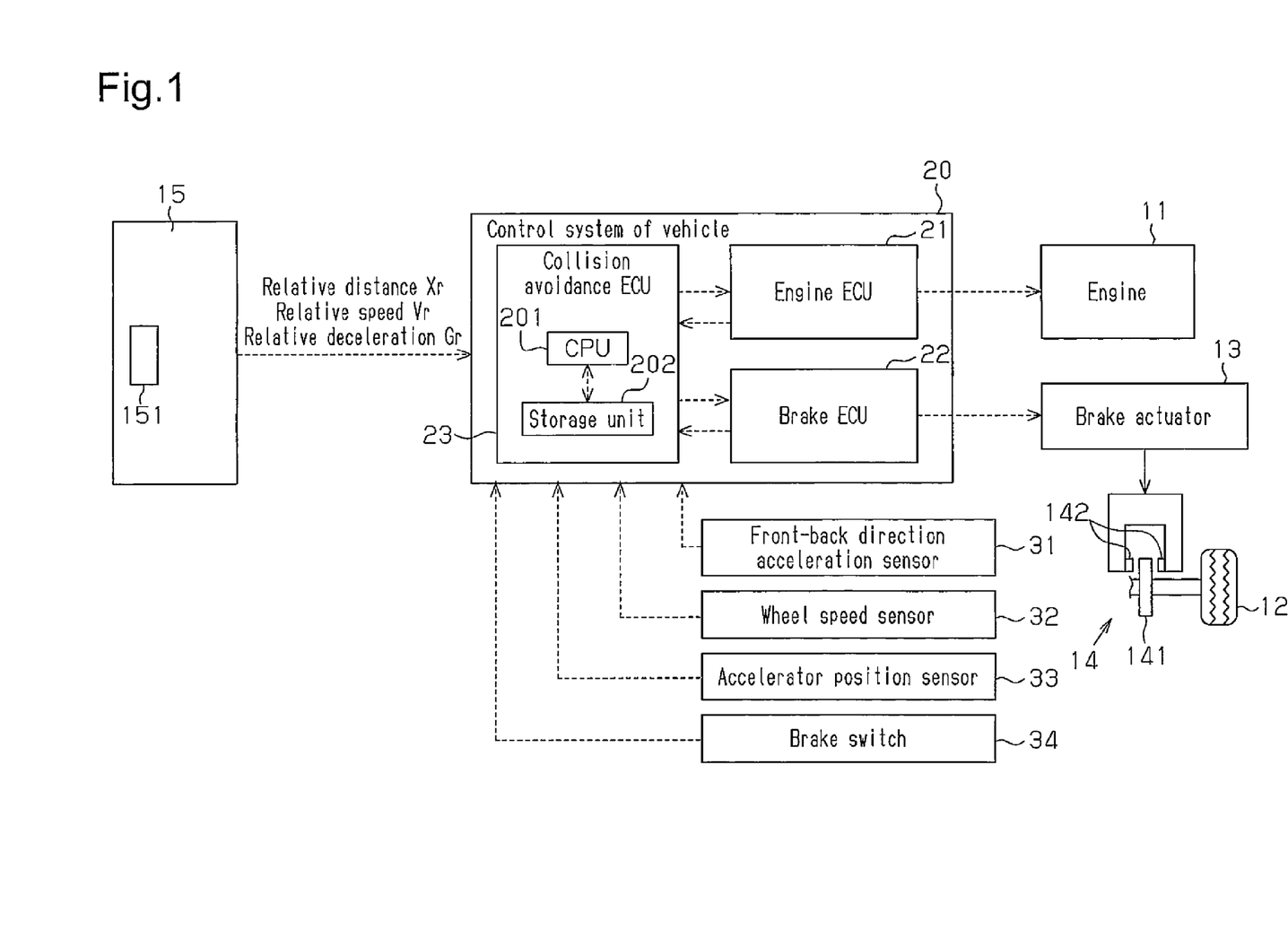
FIG. 1 is a block diagram showing a vehicle having a collision avoidance ECU that is one embodiment of a vehicle travel assist apparatus of the present invention.

As shown in FIG. 1, the vehicle is provided with an engine 11, which outputs power depending on accelerator operation by the driver, a brake actuator 13, which actuates to impart brake torque to wheels 12, and a friction-type brake mechanism 14, which is installed for each of the wheels 12. The brake mechanism 14 is provided with a rotating body 141 (such as a rotor), which rotates integrally with the wheel 12 and a friction material 142 (such as a pad), which is positioned at a position away from the rotating body 141 when the brake mechanism is not in operation. In the above-described brake mechanism 14, when the driver operates the brake or actuates the brake actuator 13, the friction material 142 is brought close to the rotating body 141. When the friction material 142 slidably contacts the rotating body 141, a brake torque depending on a frictional force between the friction material 142 and the rotating body 141 is imparted to the wheel 12.

Further, the vehicle is provided with a collision-avoidance-object recognizing system 15, which recognizes a collision avoidance object that is present ahead of the vehicle in a traveling direction. In the present embodiment, the collision avoidance object includes a preceding vehicle that runs ahead of the host vehicle in the traveling direction, a non-movable object such as a wall installed ahead of the host vehicle in the traveling direction, and objects (for example, a vehicle or a pedestrian) that has suddenly entered the traveling route of the vehicle.

The collision-avoidance-object recognizing system 15 includes a radar system, which uses radar and millimeter waves and a stereo-image processing system. The above-described collision-avoidance-object recognizing system 15 is provided with a monitoring unit 151 such as a camera, a radar, and a sensor, which are installed at a position at which it is possible to monitor the view ahead of the host vehicle in the traveling direction.

Upon recognition of a collision avoidance object by the monitoring unit 151, the collision-avoidance-object recognizing system 15 measures a relative distance Xr between the host vehicle and the collision avoidance object, a relative speed Vr of the vehicle with reference to the collision avoidance object, and a relative deceleration Gr of the host vehicle with reference to the collision avoidance object at a predetermined interval set in advance based on monitoring results by the monitoring unit 151. Then, each time the relative distance Xr, the relative speed Vr and the relative deceleration Gr are measured, the collision-avoidance-object recognizing system 15 transmits relative information on the relative distance Xr, the relative speed Vr and the relative deceleration Gr to a control system 20 of the vehicle. The relative speed Vr is a value corresponding to a value obtained by subjecting the relative distance Xr to time differentiation. Further, the relative deceleration Gr is a value corresponding to a value obtained by subjecting the relative speed Vr to time differentiation.

The control system 20 receives the relative information at a predetermined interval from the collision-avoidance-object recognizing system 15. The above-described control system 20 is electrically connected with a front-back direction acceleration sensor 31, which detects a front-back direction deceleration (hereinafter, simply referred to as deceleration) of the host vehicle and a wheel speed sensor 32, which detects a wheel speed of the wheel 12. Further, the control system 20 is electrically connected with an accelerator position sensor 33, which detects an amount of accelerator operation by a driver and a brake switch 34, which detects whether the driver operates the brake.

The control system 20 is provided with a plurality of electronic control units (ECUs), each of which has a CPU 201 and a storage unit 202 composed of a ROM, a RAM, a non-volatile memory and the like. The above-described ECUs include an engine ECU 21, a brake ECU 22, and a collision avoidance ECU 23 as an example of the travel assist apparatus.

The engine ECU 21 manages various controls of the engine 11 such as fuel injection control and adjustment/control of an intake amount. The engine ECU 21 calculates an accelerator position based on a signal detected by the accelerator position sensor 33 and transmits information on the accelerator position to other ECUs.

The brake ECU 22 manages adjustment/control of a brake torque applied to the host vehicle and adjustment/control of a brake torque for each of the wheels 12. The brake ECU 22 calculates the speed of the host vehicle based on a signal detected by at least one of the wheel speed sensors 32 of the respective wheel speed sensors 32 installed on the respective wheels 12, and the deceleration of the host vehicle based on a signal detected by the front-back direction acceleration sensor 31. Then, the brake ECU 22 transmits to the other ECUs information on whether or not the brake is operated in addition to information on the thus calculated vehicle speed and deceleration. The thus calculated deceleration is a positive value when the host vehicle is reduced in speed, while the deceleration is a negative value when the vehicle is increased in speed.

Travel information on the accelerator position, the vehicle speed, and the deceleration is calculated at an interval that is shorter than a predetermined interval at which the relative distance Xr, the relative speed Vr, and the relative deceleration Gr are measured by the collision-avoidance-object recognizing system 15.

Next, a description will be given of one example of a method for avoiding collision between a host vehicle and a collision avoidance object with reference to FIG. 2. The collision avoidance object is assumed to be a preceding vehicle C2, which runs ahead of a host vehicle C1 in the traveling direction and a relative distance Xr between the host vehicle C1 and the preceding vehicle C2 is assumed to become shorter due to sudden stop of the preceding vehicle C2.

Figure 2A:
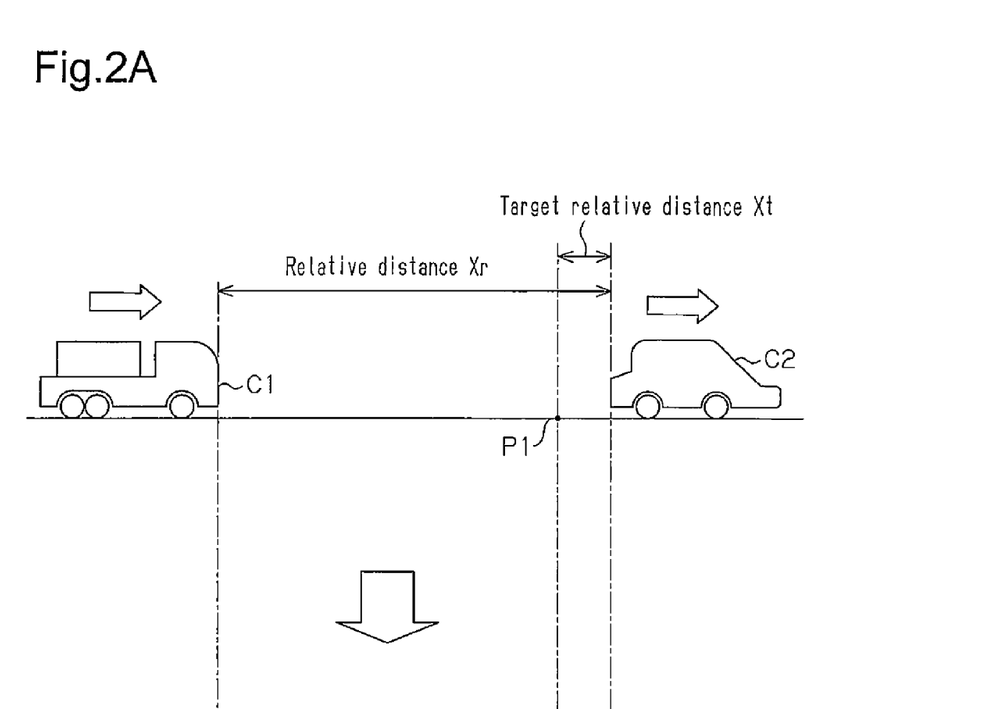
FIGS. 2A and 2B are diagrams showing avoidance of collision between a host vehicle and a preceding vehicle by performing brake control.
Figure 2B:
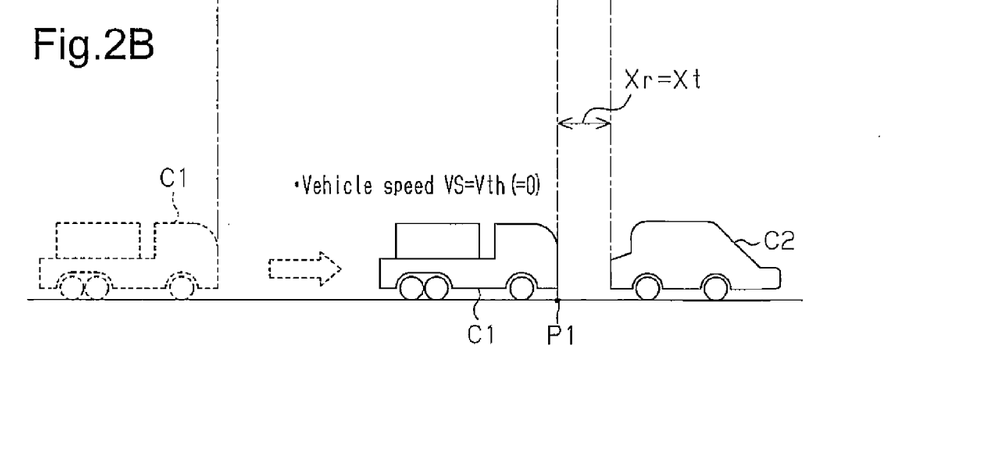

As shown in FIG. 2A, when the host vehicle C1 and the preceding vehicle C2 run at the same vehicle speed VS, in other words, when the relative speed Vr of the host vehicle C1 with reference to the preceding vehicle C2 is 0 (zero), there is no change in the relative distance Xr. However, when the host vehicle C1 runs at a constant speed and the preceding vehicle C2 is reduced in speed to stop, the relative speed Vr of the host vehicle C1 with reference to the preceding vehicle C2 is greater than 0 (zero). As a result, the relative distance Xr quickly becomes short.

Then, when the collision avoidance ECU 23 of the host vehicle C1 determines that there is a high probability of collision between the host vehicle C1 and the preceding vehicle C2, the host vehicle C1 starts to perform brake control as one example of speed-reduction control. For example, as shown in FIG. 2B, a target position P1 is set to be behind only by a target relative distance Xt (for example, 1 meter) from the preceding vehicle C2, and a target relative deceleration is set such that the relative speed Vr becomes a specified speed Vth (0 (zero) in the present embodiment) around the target position P1. That is, the brake control is performed such that the vehicle speed VS of the host vehicle C1 is 0 (zero) at the thus set target position P1.

Incidentally, even if the brake control is started for avoiding collision between the host vehicle C1 and the preceding vehicle C2, speed reduction characteristics of the host vehicle C1 at the time of the brake control may change from time to time. For example, when the brake control is performed in a state in which the host vehicle C1 is great in the carried load, the host vehicle C1 has difficulty in being increased in deceleration as compared with performing brake control in a state in which the vehicle is low in the carried load. Further, the speed reduction characteristics may change depending on the wear degree of a tire mounted to the wheel 12. Therefore, on performing the brake control, it is preferable that the target relative deceleration at the time of brake control is set to be a value corresponding to the speed reduction characteristics of the host vehicle C1 at that time.

That is, it is preferable that the target relative deceleration is determined to be a relatively great value when the brake control is performed in a state in which the host vehicle C1 has difficulty in being increased in deceleration. On the other hand, it is preferable that the target relative deceleration is determined to be a relatively small value when the brake control is performed in a state in which the host vehicle C1 is easily increased in deceleration. As described so far, the target relative deceleration is determined according to the speed reduction characteristics of the host vehicle C1 at the time point so that the relative speed Vr is able to be easily made by brake control less than or equal to a specified speed Vth in the vicinity of the target position P1. In other words, appropriate brake control is performed.

Figure 3A:
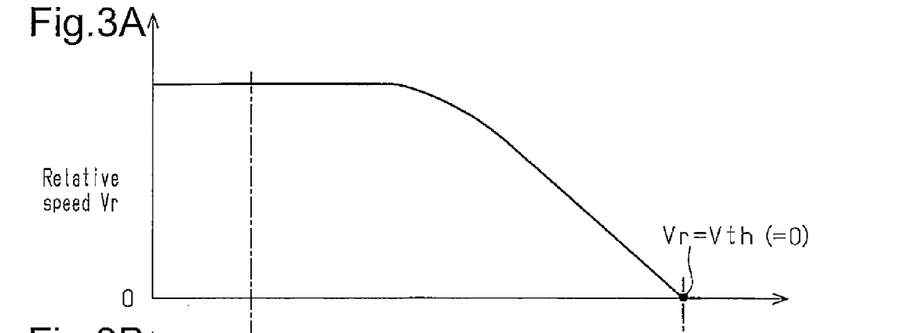
FIGS. 3A to 3C are timing charts showing changes in relative speed, relative distance and relative deceleration on performing the brake control of the present embodiment.
Figure 3B:
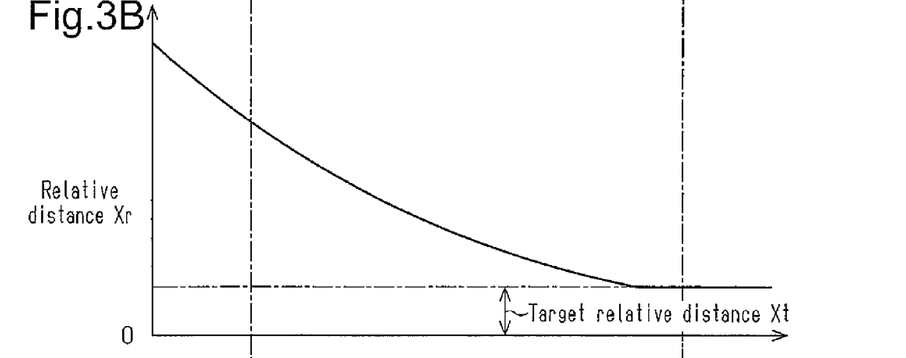
Figure 3C:
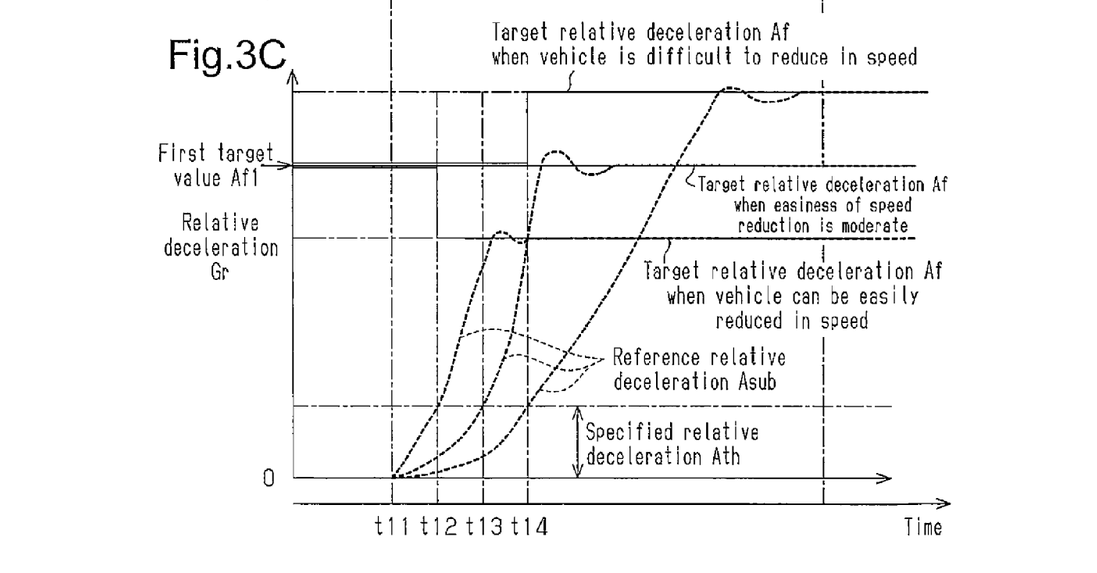

Next, a description will be given of motions of the host vehicle C1 at the time of brake control of the present embodiment by referring to the timing chart of FIG. 3. In FIG. 3, the preceding vehicle C2 is to be already stopped at the time of starting the brake control.

As shown in FIG. 3A and FIG. 3B, where the relative speed Vr is kept constant at a value greater than 0 (zero), the relative distance Xr becomes shorter gradually. Then, brake control is started when determination is made at a first time point t11 that the host vehicle C1 may collide with the preceding vehicle C2. Then, at the first time point t11, a first target value Af1 is calculated such that the relative speed Vr of the host vehicle C1 is to be 0 (zero) at the target position P1. For example, the first target value Af1 is calculated based on the vehicle speed of the host vehicle C1 at the time of starting the brake control. Then, the first target value Af1 is set to a temporary target relative deceleration Af.

Then, from the first time point t11, a first brake control is started for actuating the brake actuator 13 such that the reference relative deceleration Asub is brought close to the target relative deceleration Af (=first target value Af1) as a relative deceleration with reference to the relative deceleration Gr (Gr=0 (zero)) at this time point. Then, with a lapse of time, the reference relative deceleration Asub becomes greater and, when the reference relative deceleration Asub reaches a specified relative deceleration Ath set in advance, there is calculated the deceleration change amount Jt, which is the amount of change in the reference relative deceleration Asub at this time point. Then, a second target value Af2 is determined based on the deceleration change amount Jt, and the target relative deceleration Af is changed from the first target value Af1 to the second target value Af2. Then, in place of the first brake control, performed is a second brake control that actuates the brake actuator 13 to bring the reference relative deceleration Asub close to the target relative deceleration Af (Af=second target value Af2).

As shown in FIG. 3C, a time point at which the second target value Af2 is determined varies depending on speed reduction characteristics of the host vehicle C1 at the time of starting the brake control. This is due to the fact that the first target value Af1 is calculated, irrespective of the speed reduction characteristics of the host vehicle C1. Therefore, when the host vehicle C1 is easily reduced in speed in such a case that the vehicle is low in the carried load, the second target value Af2 is determined at a relatively early second time point t12. In this case, the second target value Af2 is set so as to be a relatively small value, for example, a value smaller than the first target value Af1 due to a great deceleration change amount Jt. Even when the second target value Af2 is set as described above, the relative speed Vr can be 0 (zero) in the vicinity of the target position P1 (a fifth time point t15) as shown in FIG. 3A to FIG. 3C.

Further, the host vehicle C1 is easily reduced in speed to some extent in such a case that the vehicle is moderate in the carried load, the second target value Af2 is determined at a third time point t13, which is later than the second time point t12. In this case, the second target value Af2 is set so as to be equal to a moderate value, for example, the first target value Af1. As described so far, the second target value Af2 is set so that the relative speed Vr can be 0 (zero) in the vicinity of the target position P1 (the fifth time point t15).

Further, when the host vehicle C1 has difficulty in being reduced in speed in such a case that the vehicle is great in the carried load, the second target value Af2 is determined at a fourth time point t14, which is later than the third time point t13. In this case, the second target value Af2 is set to a relatively great value, for example, a value greater than the first target value Af1. As described so far, the second target value Af2 is set so that the relative speed Vr can be 0 (zero) in the vicinity of the target position P1 (the fifth time point t15).

Next, a description will be given of a process routine performed by the collision avoidance ECU 23 of the present embodiment with reference to the flow chart shown in FIG. 4. The process routine is performed at a predetermined interval which has been set in advance.

Figure 4:
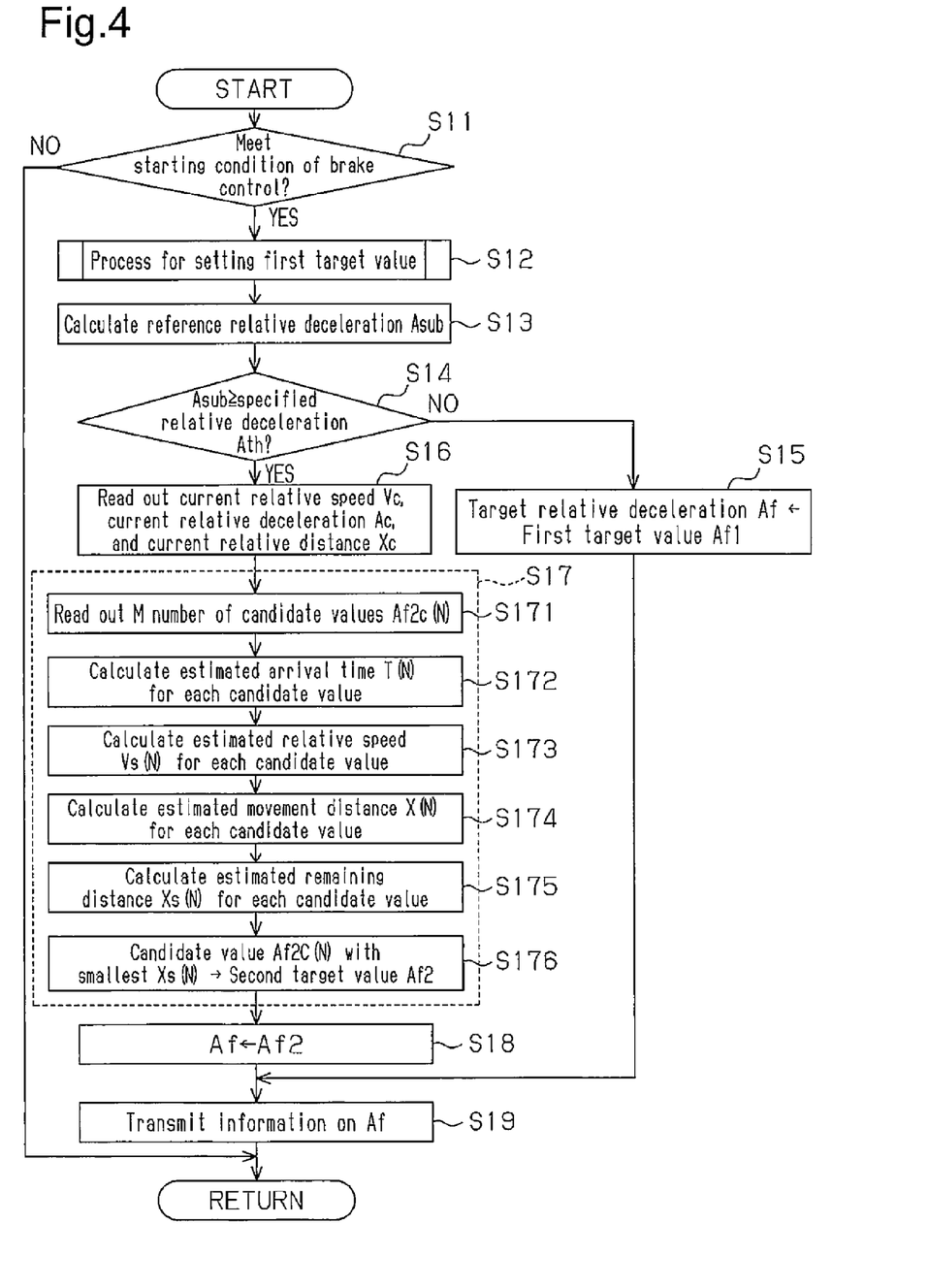
FIG. 4 is an explanatory flowchart showing a process routine performed by the collision avoidance ECU to avoid collision between the host vehicle and a collision avoidance object.

In the process routine shown in FIG. 4, the collision avoidance ECU 23 determines whether a starting condition of brake control has been met (Step S11). When no starting condition has been met (Step S11: NO), the collision avoidance ECU 23 temporarily terminates this process routine. On the other hand, when the starting condition has been met (Step S11: YES), the collision avoidance ECU 23 performs a process of setting a first target value in order to calculate the first target value Af1 (Step S12). For example, in the process of setting the first target value, the collision avoidance ECU 23 calculates the first target value Af1 by using the relational expressions (Expression 1) and (Expression 2) shown below. At this time, the first target value Af1 is to be a greater value with an increase in the vehicle speed VS when the starting condition has been met.

The relational expression (Expression 1) shows a case on the assumption that the relative deceleration Gr is a target relative deceleration from a time point of starting the brake control. Therefore, a deceleration $\alpha$ calculated by using the relational expression (Expression 1) is multiplied by a correction gain $\beta$ ($\beta>1$) to calculate the first target value Af1.

$$R = \frac{VS^2}{2 \cdot \alpha} \quad \text{(Expression 1)}$$

$$Af1 = \alpha \times \beta \quad \text{(Expression 2)}$$

In the above relational expression, R represents a relative distance Xr when the starting condition has been met (first time point t11).

Then, at the collision avoidance ECU 23, a relative deceleration Gr when the starting condition has been met is subtracted from a current relative deceleration Gr to obtain a result, and the result is set as a reference relative deceleration Asub (Step S13). Next, the collision avoidance ECU 23 determines whether the reference relative deceleration Asub calculated in Step S13 is greater than or equal to a specified relative deceleration Ath which has been set in advance (Step S14). The specified relative deceleration Ath is set based on the reference relative deceleration Asub at a time point when the host vehicle C1 is estimated to change in constant deceleration gradient by performing the first brake control.

Then, when the reference relative deceleration Asub is lower than the specified relative deceleration Ath (Step S14: NO), the collision avoidance ECU 23 sets, as a target relative deceleration Af, the first target value Af1 calculated in Step S12 (Step S15) and allows the process to proceed to Step S19, which will be described later. On the other hand, when the reference relative deceleration Asub is greater than or equal to the specified relative deceleration Ath (Step S14: YES), the collision avoidance ECU 23 reads out a current relative speed Vc, a current relative deceleration Ac and a current relative distance Xc from the storage unit 202 (Step S16). The current relative speed Vc, the current relative deceleration Ac and the current relative distance Xc correspond to a relative speed Vr, a relative deceleration Gr and a relative distance Xr upon performing the process routine at this time. Next, the collision avoidance ECU 23 performs the process of setting a second target value in order to set a second target value Af2 (Step S17).

In the process of setting the second target value, the collision avoidance ECU 23 reads out M number (M is a positive number of two or more) of candidate values Af2C(N) stored in the storage unit 202 (Step S171). For example, each of the candidate values Af2C(N) includes a plurality of values greater than the specified relative deceleration Ath and also different in size from each other. Numbers 1, 2, . . . M are substituted for N.

Then, the collision avoidance ECU 23 calculates for each of the candidate values Af2C(N) an estimated arrival time T(N), an estimated relative speed Vs(N), an estimated movement distance X(N), and an estimated remaining distance Xs(N) by using relational expressions (Expression 3) (Expression 4), (Expression 5), and (Expression 6) shown below (Steps S172, S173, S174, S175). Next, the collision avoidance ECU 23 terminates the process of setting the second target value by setting, as the second target value Af2, a candidate value in which the estimated remaining distance Xs calculated in Step S175 is smallest, of all the candidate values Af2C(N), (Step S176). For example, when the estimated remaining distance Xs(2) is smallest of estimated remaining distances Xs(1), Xs(2), . . . Xs(M), a candidate value Af2C(2) corresponding to an estimated remaining distance Xs(2) is determined as the second target value Af2.

$$T(N) = \frac{Af2C(N) - Ac}{Jt} \quad \text{(Expression 3)}$$

$$Vs(N) = Vc - (Ac \times T(N)) - \left(\frac{Jt \times T(N)^2}{2}\right) \quad \text{(Expression 4)}$$

$$X(N) = Vc \times T(N) - \frac{Ac \times T(N)^2}{2} - \frac{Jt \times T(N)^2}{6} \quad \text{(Expression 5)}$$

$$Xs(N) = (Xc - X(N)) - \frac{Vs(N)^2}{2 \times Af2C(N)} \quad \text{(Expression 6)}$$

The estimated arrival time T(N) is an estimated time necessary from a first time point, at which the reference relative deceleration Asub reaches a specified relative deceleration Ath, to a second time point, at which the reference relative deceleration Asub can reach a candidate value Af2C(N). In the present embodiment, in the interval between the first time point and the second time point, on the assumption that a relative deceleration will change at a constant gradient, the estimated arrival time T(N) is calculated based on the candidate value Af2C(N), the current relative deceleration Ac and the deceleration change amount Jt.

Further, the estimated relative speed Vs(N) is an estimated value of relative speed at the second time point. In the present embodiment, on the assumption that the relative deceleration will change at a constant gradient in the interval between the first time point to the second time point, the estimated relative speed Vs(N) is calculated based on the current relative speed Vc, the estimated arrival time T(N), the current relative deceleration Ac and the deceleration change amount Jt.

Further, the estimated movement distance X(N) is an estimated value of movement distance of the host vehicle C1 from the first time point to the second time point. In the present embodiment, on the assumption that the relative deceleration will change at a constant gradient in the interval between the first time point to the second time point, the estimated movement distance X(N) is calculated based on the current relative speed Vc, the estimated arrival time T(N), the current relative deceleration Ac and the deceleration change amount Jt.

Then, the estimated remaining distance Xs(N) is an estimated value of an interval between an arrival position of the host vehicle C1 at the time point when the relative speed Vr is 0 (zero) and the target position P1. In the present embodiment, on the assumption that the relative deceleration will be constant at the second time point and thereafter, the estimated remaining distance Xs(N) is calculated based on the current relative distance Xc, the estimated movement distance X(N), the estimated relative speed Vs(N) and the candidate value Af2C(N).

Thereafter, the collision avoidance ECU 23 sets, as a target relative deceleration Af, the second target value Af2 set in Step S176 (Step S18) and allows the process to proceed to Step S19, which is the next step.

In Step S19, the collision avoidance ECU 23 transmits to the brake ECU 22 information on the target relative deceleration Af set in Step S15 or in Step S18. Then, the collision avoidance ECU 23 temporarily terminates this process routine.

The brake ECU 22, which has received the information, performs brake control for controlling the brake actuator 13 so that the reference relative deceleration Asub is brought close to the target relative deceleration Af. That is, the collision avoidance ECU 23 of the present embodiment performs the first brake control as one example of the first speed-reduction control when the target relative deceleration Af is set in Step S15. Further, the collision avoidance ECU 23 performs the second brake control in place of the first brake control as one example of the second speed-reduction control when the target relative deceleration Af is set in Step S18.

While performing the brake control, the engine ECU 21 performs limit control to limit the power transmitted from the engine 11 to the wheels 12.

Figure 5A:
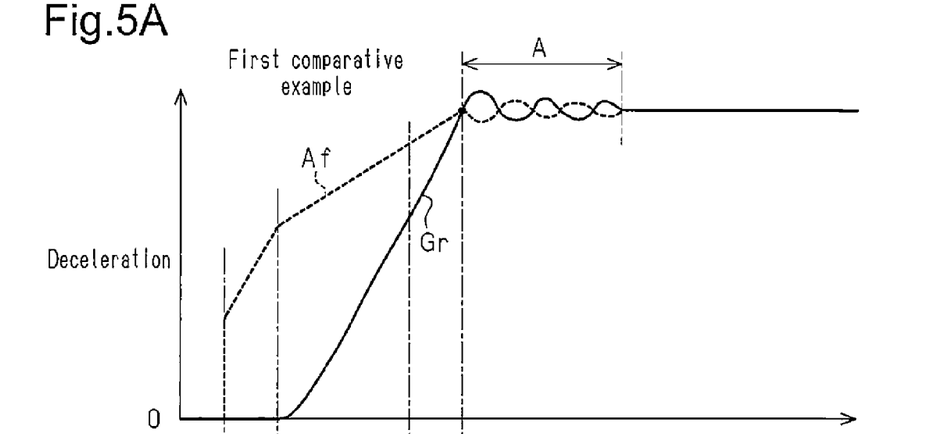
FIGS. 5A to 5C are explanatory timing charts showing how the deceleration is different between a case where brake control of the present embodiment is performed and a case where brake control of each of the first and second comparative examples is performed.
Figure 5B:
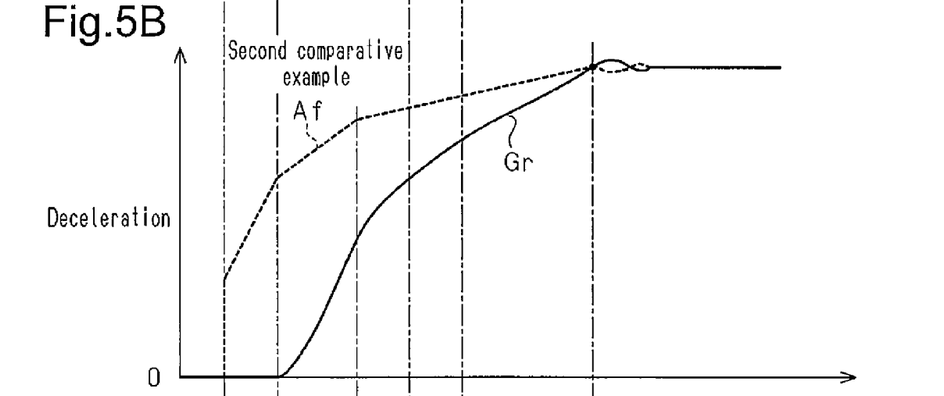
Figure 5C:
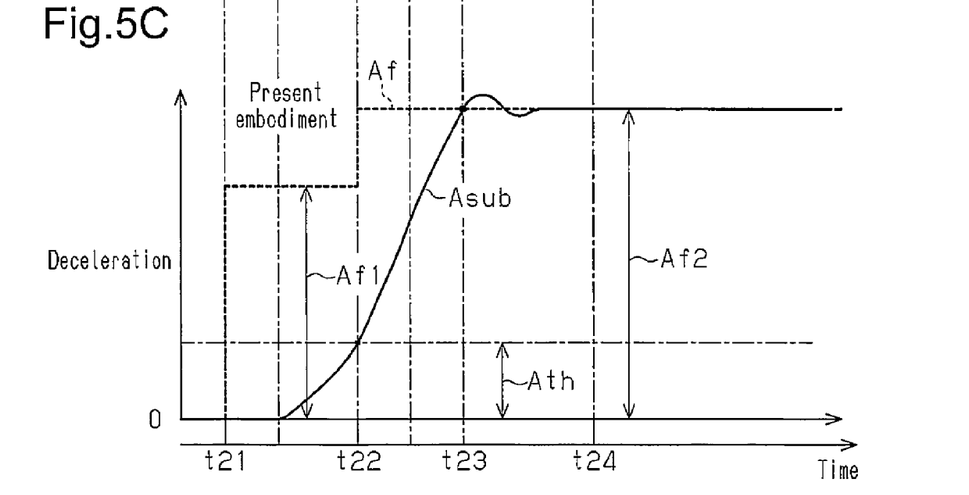

Next, a description will be given of a comparison between the brake control of the present embodiment and the brake control of two comparative examples shown below with reference to the timing chart of FIG. 5.

In the brake control of each of the first and the second comparative examples, the difference between the relative deceleration Gr at the time point and the target relative deceleration Af at the time point is calculated at an interval that has been set in advance, and a target relative deceleration Af at the next time is calculated based on this difference. Then, the brake actuator 13 is controlled such that the relative deceleration Gr at the time point is brought close to the target relative deceleration Af at the next time.

In the brake control of the first comparative example, a control gain (such as a proportional gain) used on performing the brake control is set to be a great value as compared with the brake control of the second comparative example. Therefore, when the brake control including feedback control is performed, as shown in FIG. 5A and FIG. 5B, the first comparative example is shorter than the second comparative example in terms of a period of time from the first time point t21, at which the brake control is started, to the third time point t23, at which the relative deceleration Gr reaches the vicinity of the final target relative deceleration Af. However, due to a great control gain and appropriate change of the target relative deceleration Af even after the third time point t23, an overshoot in which the relative deceleration Gr exceeds the target relative deceleration Af and an undershoot in which the relative deceleration Gr is lower than the target relative deceleration Af are repeated at the third time point t23 and thereafter. As a result, a period A in which the relative deceleration Gr converges to a constant value will become longer.

On the other hand, it takes a longer time for the relative deceleration Gr to reach the vicinity of a final target relative deceleration Af in the second comparative example than in the first comparative example. That is, the relative deceleration Gr reaches the vicinity of the final target relative deceleration Af at the fourth time point t24, which is later than the third time point t23. However, after reaching the vicinity of the relative deceleration Gr of the final target relative deceleration Af, the relative deceleration Gr converges at a constant value earlier due to a small control gain.

In contrast, in the present embodiment, when the brake control (first brake control) is started at the first time point t21, the reference relative deceleration Asub reaches a specified relative deceleration Ath at the second time point t22 before the third time point t23. In the interval between the first time point t21 and the second time point t22, the target relative deceleration Af is constant in first target value Af1. At the second time point t22, the deceleration change amount Jt is given as a value close to a limit value of deceleration change amount based on speed reduction characteristics of the host vehicle C1 at that time. Then, the second target value Af2 is determined at the above-described second time point t22, and at the second time point t22 and thereafter, the second brake control is performed in place of the first brake control so that the reference relative deceleration Asub reaches the second target value Af2.

In the present embodiment, which is different from each of the above-described comparative examples, at a time point and thereafter at which the reference relative deceleration Asub reaches the vicinity of the final target relative deceleration Af, the target relative deceleration Af may be changed to a lower probability. That is, even at a period of time when there occurs an overshoot in which the relative deceleration Gr exceeds the target relative deceleration Af and an undershoot in which the relative deceleration Gr is lower than the target relative deceleration Af occurs, the target relative deceleration Af is highly likely to be a constant value. Therefore, as compared with the first comparative example, the difference will diminish easily on occurrence of the overshoot and the undershoot (in other words, the difference between the relative deceleration Gr and the target relative deceleration Af at the time point). Thus, even when the above-described control gain is set to be a great value as with the first comparative example, the reference relative deceleration Asub is able to easily converge to a constant value earlier at the third time point t23 and thereafter at which the reference relative deceleration Asub reaches the vicinity of the target relative deceleration Af. As a result, the host vehicle C1 varies in deceleration to a lesser extent, thereby suppressing reduction in drivability at the time of brake control. Further, as described above, with consideration given to the fact that the control gain can be set at a great value, as with the first comparative example, the reference relative deceleration Asub reaches earlier the vicinity of the final target relative deceleration Af.

The above description has referred to a case where a travel state of the preceding vehicle C2 is constant (in other words, the vehicle is stopped). However, in reality, the travel state of the preceding vehicle C2 can be changed, for example, during brake control, the preceding vehicle C2 makes a sudden start or the preceding vehicle C2 now travel makes a sudden stop. In this case, there is a possibility that the previous relative distance Xr may differ significantly from the current relative distance Xr. In each of the first and the second comparative examples, it is difficult to smoothly modify the target relative deceleration Af in the case of a sudden change in travel state of the preceding vehicle C2. Therefore, it is difficult to say that the brake control can be performed properly in the case of a sudden change in travel state of the preceding vehicle C2.

In contrast, in the present embodiment, when the relative distance Xr undergoes a significant change, each of the estimated remaining distances Xs(N) is newly calculated based on the above-described relational expression (Expression 6) to change the second target value Af2. Then, the second brake control is to be performed based on the thus changed second target value Af2. That is, it is possible to appropriately adjust a control mode of the brake control in accordance with a sudden change in travel state of the preceding vehicle C2.

As described above, the present embodiment has the following advantages.

(1) When the reference relative deceleration Asub reaches the specified relative deceleration Ath while performing the first brake control, the second target value Af2 is determined based on the deceleration change amount Jt, which is the amount of change in the reference relative deceleration Asub at the time point. Then, the second brake control, which brings the reference relative deceleration Asub close to the second target value Af2, is performed in place of the first brake control. As a result, it is possible to make the target relative deceleration Af into a constant value earlier than in the first and the second comparative examples. Thus, even when the brake control is performed, with a control gain set at a greater value, it is possible to smoothly converge deceleration of the vehicle in the process of brake control to a constant value. The reference relative deceleration Asub can reach the vicinity of the final target relative deceleration Af early. It is, therefore, possible to start the brake control at an appropriate timing without reduction in drivability.

(2) In the present embodiment, on determining the second target value Af2, a greater candidate value is selected with a decrease in deceleration change amount Jt from a plurality of candidate values Af2C(N) stored in the storage unit 202. Based on the thus selected candidate value, the second target value Af2 is determined. As described so far, the second target value Af2 is determined according to easiness in speed reduction of the host vehicle C1 at that time. Thereby, it is possible to make the relative speed Vr equal to or lower than the specified speed Vth at the vicinity of the target position P1, irrespective of speed reduction characteristics of the host vehicle C1 at the time point.

(3) More specifically, among the plurality of candidate values Af2C(N) stored in the storage unit 202, a candidate value having the shortest estimated remaining distance Xs, is set as the second target value Af2. As a result, the relative speed Vr can be 0 (zero) at a position close as possible to the target position P1. Therefore, it is possible to impart an appropriate brake torque to the host vehicle C1 on performing the brake control.

(4) In the present embodiment, the first target value Af1 is set so as to be a greater value with an increase in relative speed Vr at the start of brake control. There is performed the first brake control which brings the reference relative deceleration Asub close to the thus set first target value Af1. Thereby, it is possible to obtain, as the deceleration change amount Jt, a value close to a limit value of amount of change in relative deceleration which can occur for the host vehicle C1 at a time point when the reference relative deceleration Asub reaches a specified relative deceleration Ath. Therefore, the second target value Af2 can be easily set to give a value corresponding to the speed reduction characteristics of the host vehicle C1 at that time.

The above embodiment may be modified to the embodiments described below.

It is acceptable that when deceleration of the host vehicle C1 is great at the time of meeting the starting condition of brake control, the first target value Af1 is set so as to give a greater value than when the deceleration thereof is small.

It is acceptable that the first target value Af1 is to give a predetermined value set in advance, irrespective of the relative speed Vr or others at the time of meeting the starting condition of brake control.

As described above, it is acceptable that when the first target value Af1 is set, irrespective of the relative speed Vr and others at the time of meeting the starting condition of brake control, the specified relative deceleration Ath is to give a greater value with an increase in relative speed Vr at the time of meeting the starting condition.

It is acceptable that on determining the second target value Af2, an estimated remaining distance Xs that is a positive value is extracted from respective estimated remaining distances Xs(N) calculated by using the above-described relational expression (Expression 6), and the candidate value Af2C corresponding to the smallest estimated remaining distance, of the thus extracted estimated remaining distances Xs, is set as the second target value Af2.

It is acceptable that the second target value Af2 is set as a value which is obtained by multiplying a predetermined gain set in advance by a candidate value Af2C(N) having the smallest estimated remaining distance Xs. It is acceptable that, for example, the predetermined gain is set as a predetermined value set in advance or it is set based on a state of the host vehicle C1 such as the vehicle speed. It is also acceptable that the predetermined gain is set based on control results of the previous brake control and a state of the host vehicle C1 learned from a normal control state. It is, however, preferable that the predetermined gain is a value greater than or equal to 1 (for example, 1.1).

It is acceptable that the second target value Af2 is determined as a candidate value Af2C(N) corresponding to the second smallest estimated remaining distance Xs.

As apparent from FIG. 3, depending on whether the host vehicle C1 can be easily reduced in speed or has difficulty in being reduced in speed, there is a difference in time point at which the reference relative deceleration Asub becomes greater than or equal to the specified relative deceleration Ath. Therefore, it is acceptable that in place of the deceleration change amount Jt, which is the amount of change in the reference relative deceleration Asub when the reference relative deceleration Asub becomes greater than or equal to the specified relative deceleration Ath, there is obtained a period of time between a time point when the starting condition of brake control has been met and a time point when the reference relative deceleration Asub becomes greater than or equal to the specified relative deceleration Ath. Then, it is also acceptable that when the thus obtained period of time is longer, the second target value Af2 is set so as to give a greater value than when the period of time is shorter. Adoption of the above-described control configuration will also enable to obtain the same advantages as those of the above-described embodiment.

As long as two or more candidate values greater than the specified relative deceleration Ath are stored in the storage unit 202, it is acceptable that a candidate value equal to or less than the specified relative deceleration Ath is stored in the storage unit 202.

It is acceptable that each of the candidate values Af2C(N) is a predetermined value set in advance or a value that is changed (learned) for each performing brake control.

It is acceptable that the speed-reduction control is control including driving control adjusting a driving torque to a wheel, in addition to brake control that adjusts brake torque to the host vehicle C1.

It is acceptable that the collision-avoidance-object recognizing system 15 is not able to measure the relative speed Vr or the relative deceleration Gr as long as it has functions to measure the relative distance Xr. In this case, it is acceptable that the collision avoidance ECU 23 uses a relative distance Xr obtained from the collision-avoidance-object recognizing system 15 to calculate the relative speed Vr and the relative deceleration Gr.

It is acceptable that when the relative speed Vr is made less than or equal to the specified speed Vth to the target position P1 set ahead of the host vehicle C1 in the traveling direction, the speed-reduction control is performed in a case other than avoidance of collision between the host vehicle C1 and a collision avoidance object. For example, when the vehicle passes through a toll gate of a toll road, the target position P1 is set in front of the toll gate and the speed-reduction control is performed such that on passage through the target position P1, the relative speed Vr (in this case, the speed of the vehicle) becomes less than or equal to a specified speed Vth. In this case, the specified speed Vth may be set to be a value greater than or equal to 0 (zero) (for example, 20).

It is acceptable that the travel assist apparatus is used as the brake ECU 22 and the engine ECU 21, for example.

The technical ideas obtainable from the above illustrated embodiment and the modified embodiments other than those disclosed in the claim section will now be described below with their advantages.

(1) It is preferable that the travel assist apparatus is provided with a storage unit (202) that stores candidate values (Af2C(N)) that include a value greater than a specified relative deceleration (Ath) and are different from one another, wherein the travel assist apparatus is configured such that when the deceleration change amount (Jt) is obtained by the travel assist apparatus, the second speed-reduction control is performed to select, based on the thus obtained deceleration amount of change (Jt), a candidate value at which an interval (Xs) can be second smallest between a position of the host vehicle (C1) at a time point when the relative speed (Vr) reaches the specified speed (Vth) and the target position (P1), and the second target value (Af2) is determined based on the thus selected candidate value.

(2) It is preferable that the second target value (Af2) is determined to be such a value that the vehicle (C1) at the time when the relative speed (Vr) is made equal to or lower than the specified speed (Vth) is positioned behind an object (C2).

DESCRIPTION OF THE REFERENCE NUMERALS 21, 22, 23: ECUs as examples of travel assist apparatus
202: storage unit
Af: target relative deceleration
Af1: first target value
Af2: second target value
Af2C(N): candidate value
Asub: reference relative deceleration
Ath: specified relative deceleration
C1: host vehicle
C2: preceding vehicle as an object
Gr: relative deceleration
Jt: deceleration change amount
P1: target position
T(N): estimated arrival time
Vr: relative speed
Vs(N): estimated relative speed
VS: vehicle speed
Vth: specified speed
X(N): estimated movement distance
Xs: estimated remaining distance as an interval

The invention claimed is:

1. A vehicle travel assist apparatus, which performs speed-reduction control in which a relative deceleration of a host vehicle with respect to an object present ahead of the host vehicle in a traveling direction becomes equal to a target relative deceleration, and a relative speed of the host vehicle with reference to the object becomes less than or equal to a specified speed at a target position set behind the object, the vehicle travel assist apparatus being characterized in that at the time when a starting condition of the speed-reduction control is met, the target relative deceleration is set as a first target value, and first speed-reduction control is performed to bring the relative deceleration closer to the target relative deceleration, when a reference relative deceleration, which is determined with reference to a relative deceleration at the time point when the first speed-reduction control has started, reaches a specified relative deceleration, if a deceleration change amount, which is an amount of change in the reference relative deceleration at the time point, is small, a second target value is set to a greater value than that in a case where the deceleration change amount at the time point is great, and the second speed-reduction control is performed to set the target relative deceleration to the second target value and bring the relative deceleration closer to the target relative deceleration.

2. The vehicle travel assist apparatus according to claim 1, further comprising a storage unit, which stores candidate values that include a value greater than the specified relative deceleration and are different from one, another, wherein the travel assist apparatus is configured such that when the deceleration change amount obtained by the travel assist apparatus is small, a candidate value having a greater value than when the deceleration change amount is great is selected, and the second target value is determined based on the thus selected candidate value.

3. The vehicle travel assist apparatus according to claim 1, further comprising a storage unit, which stores candidate values that include a value greater than the specified relative deceleration and are different from one another, wherein the travel assist apparatus is configured such that when the deceleration change amount is obtained by the travel assist apparatus, the second speed-reduction control is performed to select, based on the thus obtained deceleration amount of change, a candidate value at which an interval can be smallest between a position of the host vehicle at a time point when the relative speed reaches the specified speed and the target position, and the second target value is determined based on the thus selected candidate value.

4. The vehicle travel assist apparatus according to claim 3, which is configured such that when the travel assist apparatus determines the second target value, there are calculated for each candidate value:

an estimated arrival time, which is an estimated time required from a first time point at which the reference relative deceleration has reached the specified relative deceleration to a second time point at which the reference relative deceleration reaches a candidate value;

an estimated relative speed, which is an estimated value of the relative speed at the second time point; and an estimated movement distance, which is an estimated value of movement distance of the host vehicle from the first time point to the second time point, and the interval is calculated for each candidate value based on the estimated arrival time, the estimated relative speed, and the estimated movement distance, which have been calculated.

5. The vehicle travel assist apparatus according to claim 1, which is configured such that when the first speed-reduction control is performed, the travel assist apparatus sets the first target value to be a greater value when the vehicle speed of the host vehicle is great than when the vehicle speed is low.

* * * * *